Sept. 4, 1934.        W. C. VAN DRESSER        1,972,412
TRIMMING
Filed March 28, 1932        3 Sheets-Sheet 3
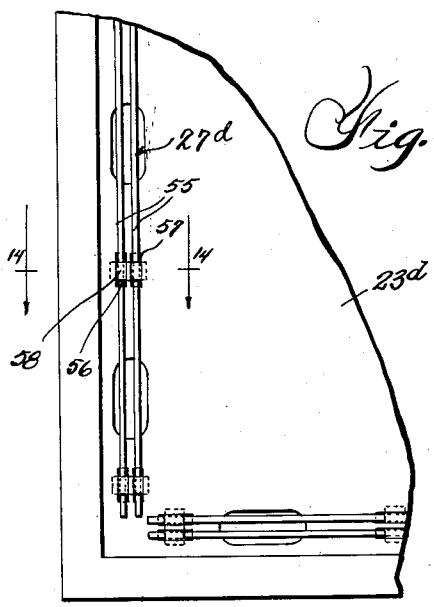
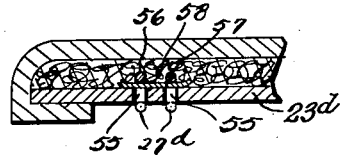
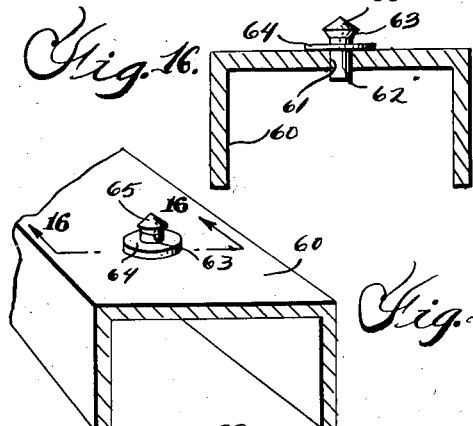
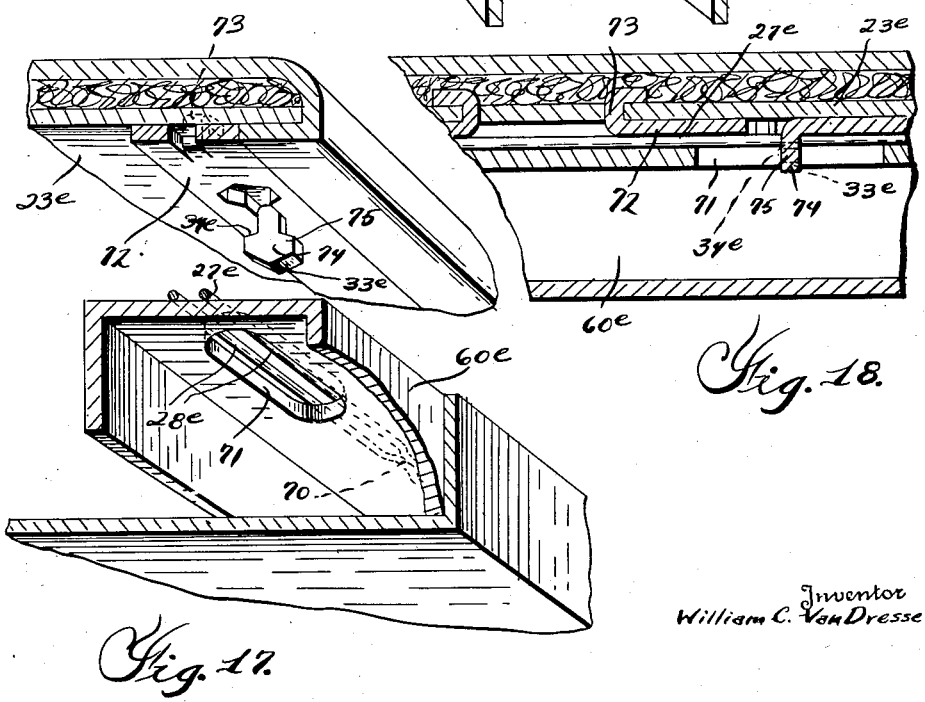
Inventor
William C. Van Dresser
By Whittemore Hulbert & Whittemore Belknap
Attorneys Patented Sept. 4, 1934

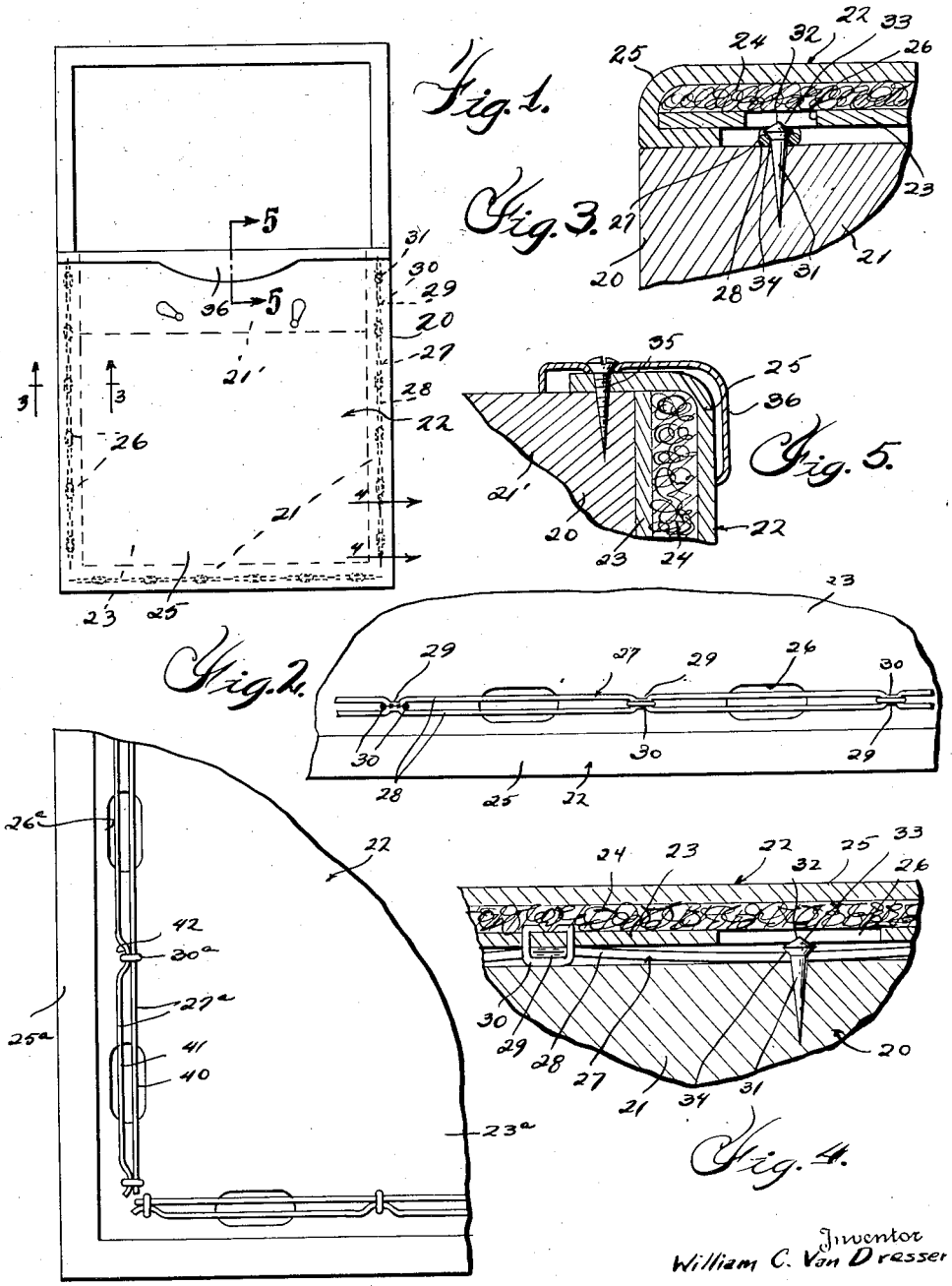

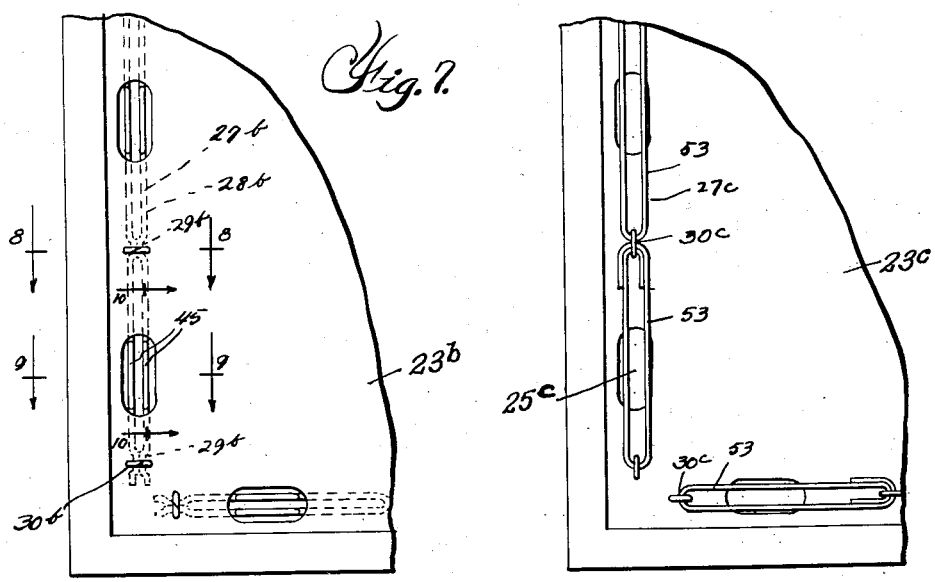
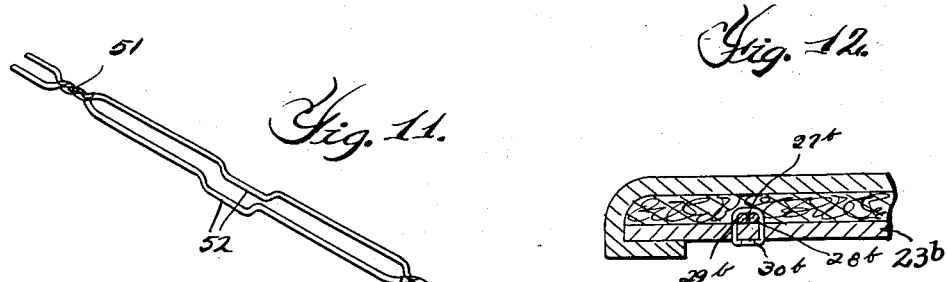
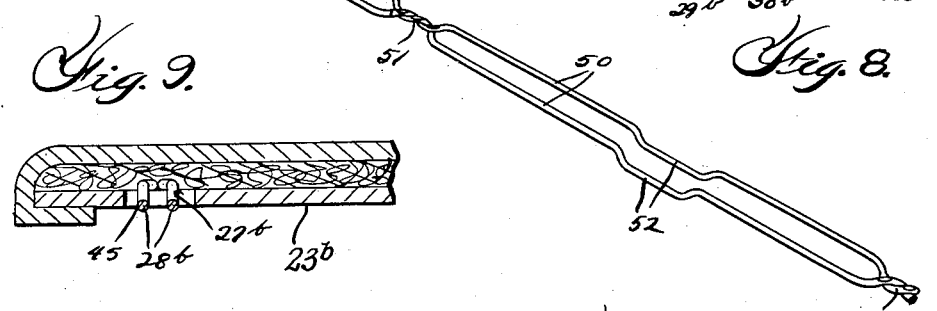
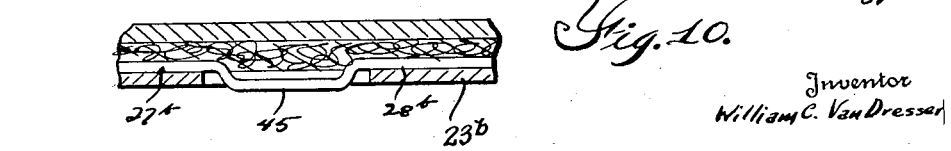

1,972,412

UNITED STATES PATENT OFFICE 1,972,412

TRIMMING

William C. Van Dresser, Detroit, Mich., assignor to Van Dresser Specialty Corporation, Detroit, Mich., a corporation of Michigan Application March 28, 1932, Serial No. 601,708

22 Claims. (Cl. 45—138)

This invention relates to the trimming and upholstering of automobile bodies and the like.

In the trimming of closed automobile bodies and the like, it is the general practice to form a panel which comprises a backing panel of cardboard, fiber board or the like, and a covering for this panel of some upholstery material such as broadcloth, velour or the like. This trimmed panel is then secured to the frame of the vehicle body, which frame may be either wood or metal.

It is preferable to detachably secure this trimmed panel to the frame so that the same may be removed either for the purpose of replacement or repair should the same become damaged, or for the purpose of facilitating access to the space behind the panel where window actuating mechanisms and the like are positioned.

The present invention contemplates the provision of means for detachably securing a trimmed panel of the above mentioned character to a frame, which means may be incorporated in a construction where the frame is either wood or metal.

Further, the invention contemplates the provision of a detachable securing means for the above purpose which will include male and female securing members having a snap engagement with each other.

Still further the invention contemplates the provision of a securing means of the above mentioned character in which the male and female members need not be accurately located with respect to each other, thus eliminating the expense of accurately positioning the several members of the securing means on the frame and trimmed panel.

Still further the invention contemplates the provision of a securing means which will be simple in construction and which may be readily associated with a panel and frame to accomplish the desired results.

Numerous other objects and advantages of this invention will become more apparent as the following description proceeds, particularly when reference is had to the accompanying drawings, wherein:

Fig. 1 is an elevational view of a motor vehicle door with a trimmed panel secured in place thereon in accordance with the teachings of this invention;

Fig. 2 is a fragmentary plan view of a portion of the panel shown in Fig. 1;

Fig. 3 is a sectional view taken substantially on the line 3—3 of Fig. 1;

Fig. 4 is a sectional view taken substantially on the line 4—4 of Fig. 1;

Fig. 5 is a sectional view taken substantially on the line 5—5 of Fig. 1;

Fig. 6 is a view similar to Fig. 2 showing a slightly modified form of construction;

Fig. 7 is a view similar to Fig. 2 showing a further modified form of construction;

Fig. 8 is a sectional view taken substantially on the line 8—8 of Fig. 7;

Fig. 9 is a sectional view taken substantially on the line 9—9 of Fig. 7;

Fig. 10 is a sectional view taken substantially on the line 10—10 of Fig. 7;

Fig. 11 is a fragmentary perspective view of a slightly modified form of element for use as a part of the securing means;

Fig. 12 is a view similar to Fig. 2 showing a further modified form of construction;

Fig. 13 is a view similar to Fig. 2 showing a still further modification of the inventive idea;

Fig. 14 is a sectional view taken substantially on the line 14—14 of Fig. 13;

Fig. 15 is a fragmentary perspective view of a metallic frame member with connecting means constructed in accordance with the teachings of this invention associated with the same;

Fig. 16 is a sectional view taken substantially on the line 16—16 of Fig. 15;

Fig. 17 is a semi-diagrammatic perspective view of a slightly modified form of construction; and Fig. 18 is a longitudinal sectional view through the structure shown in Fig. 17.

During the following description the invention will be described as being incorporated in a door construction of a motor vehicle. It is to be understood, however, that this embodiment is selected only for the purposes of illustration and that the invention will find equal utility in securing other trimmed panels in position in the interior of a motor vehicle or in securing any trimmed panel to a metal or wooden frame of any desired character.

Referring then particularly to the drawings wherein like reference characters designate corresponding parts throughout all views, the numeral 20 designates generally a vehicle door, the lower portion of which is provided in accordance with the usual practice with a border frame 21. The reference character 22 designates generally a trimmed panel, and the present invention is directed more particularly to means for securing this panel to the frame 21 in such a manner that the panel will be held securely in position, but may be readily removed to provide access to the space behind the panel.

In accordance with the usual practice the panel comprises a backing panel 23 which may be of cardboard, fiber board or the like. The reference character 24 designates a suitable fibrous wadding material which is disposed between the backing panel and the upholstery covering 25, the edge of the latter being folded around the edge of the backing panel and being secured thereto by glue or the like, in accordance with the usual practice.

The panel 23 is provided at spaced points along its side and bottom edges with openings 26, which openings may be conveniently formed in the panel during the cutting of the latter to the desired size and shape. Fixed to the under face of the panel adjacent the side and bottom edges thereof are members 27 which constitute the female members of the securing means by which the panel is secured to the frame 21.

It will be noted that each member 27 comprises a pair of resilient wires 28, each wire being provided at spaced points with offset portions 29, the offset portions of each wire being adapted to abut the corresponding offset portions of the other wire of the unit. These abutting offset portions are welded together so that the two wires are rigidly secured together at spaced points, but are spaced from each other intermediate these spaced points. Each unit is secured in position on its respective panel by clips 30 which may, as illustrated in Figs. 2 and 4 of the drawings, span the offset portions of the wires, the free ends of the clips projecting through the panel and being bent over to firmly secure the female connecting member to the panel.

In the embodiment of the invention illustrated in Figs. 1 to 5, inclusive, of the drawings, the frame 21 is a wooden frame, and fixed to this frame at spaced points are studs 31 having heads 32 oppositely tapered to form the cam faces 33 and 34. These studs are suitably located on the wooden frame by a template (not shown), the studs being driven into the frame to positions where the heads of the studs are spaced slightly above the face of the frame, as illustrated in Fig. 4 of the drawings.

It will be noted that the openings 26 in the panel are aligned with the spaced portions of the wires 28, and with these wires secured to the panel 23, it will be obvious that this panel with the upholstery material thereon may be secured to the wooden frame by pressing downwardly on the panel to force the spaced portions of the wires over the heads of the studs. It will be obvious that the cam faces 33 of the heads of the studs will aid in guiding the heads of the studs between the spaced portions of the wires 28 and will also tend to spread these wires until the cam portions 34 of the heads are engaged by the wires, these cam portions then tending to draw the spaced portions of the wires down into engagement with the face of the wooden frame in the manner illustrated in Fig. 3 of the drawings. It will be understood that the resiliency of the wires will provide for the yielding of these wires to facilitate the engagement of the heads of the studs between the wires in the manner illustrated.

The wires 28 being secured to the panel adjacent the side and bottom edges thereof will tend to reinforce the panel so that a backing panel of relatively light gauge cardboard may be utilized. Further, by virtue of the fact that the openings 26 are relatively large and the wires 28 are spaced from each other through a major portion of their length to form elongated loops, the panel may be secured to the frame despite slight variations in the positioning of the studs on the frame.

The upper edge of the trimmed panel is preferably flush with the top cross member 21' of the frame and the free edge of the upholstery covering of the panel is preferably folded over the upper edge of this cross member and secured thereto by a screw or the like 35 which also serves to secure the garnish molding 36 in position. This garnish molding holds the upper edge of the trimmed panel securely in position adjacent the upper cross member of the frame, with the result that if it is not desired to entirely remove the trimmed panel, the garnish molding 36 may be left in position and the panel swung upwardly away from its frame by merely disconnecting the securing means at the side and bottom edges of the frame.

In operation it will be apparent that in securing the trimmed panel to the frame the panel will be placed in position and then forced toward the frame to engage the heads of the studs between the loop portions of the spring wires 28. The resiliency of these wires engaging the cam faces 34 of the heads of the studs will tend to draw the trimmed panel into snug engagement with the frame. After the panel has been secured to the frame along the side and bottom edges thereof, the garnish molding may be placed in position and secured to the upper cross member 21' of the frame. If now, it is desired to entirely remove the panel, the garnish molding may be removed and the panel then removed by pulling the same outwardly away from the frame, the wires 28 yielding to permit disengagement of the loops from the heads of the studs. If it is not desired to entirely remove the panel and it is only desired to obtain access to the space behind the panel, the garnish molding may be left in position and the panel disengaged from its frame only along the side and bottom edges.

Thus it will be apparent that the invention provides female securing members which may be economically produced from resilient wire strips and which may be readily secured to the edges of a trimmed panel. These securing members are arranged to have a snap engagement with male securing members which are suitably secured to the wooden frame, and the structure of the female securing members is such that the male securing members may be engaged with the same regardless of slight variations in the spacing of the male securing members on the wooden frame. The wires being secured as they are to the backing panel adjacent the edges thereof will reinforce this panel and prevent warping of the same even though a relatively light material is utilized.

In Fig. 6 a slightly modified form of construction is illustrated in which the panel 23ᵃ is shown as being provided with an upholstery covering 25ᵃ. The panel is provided with blanked out openings 26ᵃ, and secured to the under face of the panel adjacent these openings are female securing members 27ᵃ. Each member 27ᵃ comprises in this embodiment of the invention a relatively straight wire strip 40. Cooperating with this wire strip is a second wire 41 having offset portions 42 arranged to engage the straight wire at spaced points longitudinally thereof. The two wires may be secured as a unit to the panel by virtue of clips 30ᵃ which embrace the two wires at the point where the offset portions 42 of the wire 41 engage the wire 40.

As in the first described form of construction, the wires will be spaced from each other throughout the major portions of their length to provide elongated resilient sockets for receiving the heads of male securing members. Further, the two wires will be disposed adjacent the edges of the backing panel to reinforce the latter without, however, being so close to the edges of this panel as to prevent the gluing thereto of the folded edge of the upholstery material.

In Figs. 7 to 10, inclusive, a slightly modified form of construction is disclosed in which the securing member 27$^b$ is fixed to the panel with the major portion of this member on the front face of the backing panel. It will be noted that this securing member comprises wires 28$^b$ having offset portions 29$^b$ which engage each other and are welded together. These wires are, however, also provided with offset portions 45 arranged to project through the openings 26$^b$ formed in the panel 23$^b$. Clips 30$^b$ are provided for securing the members 27$^b$ to the panel adjacent the edges thereof.

It will be apparent that by virtue of this construction the body portions of the members 27$^b$ will be disposed on the front side of the backing panel so that the force exerted by this member on the panel will be distributed along the length thereof. The offset portions 45 of the securing member will project through the openings in the panel for engagement with the heads of the studs which are secured to the wooden frame member. As in the first described form of construction, the resiliency of the wires 28$^b$ will provide for engagement and disengagement of the same with the heads of the studs which are secured to the wooden frame.

In Fig. 11 a slightly modified form of female securing element is disclosed as comprising wires 50 secured together at spaced points by the twisted portions 51. These portions are preferably flattened so that the spaced portions of the wire will lie in the same plane, on opposite sides of the twisted portions, and so that further, the flattened twisted portions of the wires will lie flat against the panel to which they are secured. The wires 50 are preferably provided also with the offset portions 52 capable of projecting through the openings formed in the backing panel in the same manner as the portions 45 of the wires 28$^b$.

In Fig. 12 a further modification of the invention is disclosed as comprising a female securing member 27$^c$. This member comprises a plurality of wire loops 53 secured together and to the panel 23$^c$ by clips 30$^c$. It will be noted that the free ends of each wire forming the loop 53 are return-bent so that these free ends overlap a sufficient extent to be held in engagement with each other by the clips 30$^c$.

In this form of construction it will be apparent that the spacing of the wires throughout the body portions of the loops will provide for resilient engagement of these loops with the heads of the studs which are secured to the frame member, the spaced portions of the wires 53 being aligned with the openings 25$^c$ in the backing panel 23$^c$.

In Figs. 13 and 14 a further modified form of construction is disclosed in which the female portion 27$^d$ of the securing means is formed of wires 55 which are spaced from each other throughout their entire length. These wires are, however, provided at spaced points with offset portions 56 which project through slots 57 formed in the backing panel 23$^d$. The offset portions of the wires are prevented from pulling out of their respective slots by keys 58, in the manner illustrated in Fig. 14 of the drawing.

In this form of invention it will be apparent that the wires 55 are spaced throughout their length to clampingly receive the heads of the male securing studs. The wires are, however, held in spaced relation to each other by their engagement in slots formed in the backing panel, the wires being rigidly secured to the backing panel by virtue of the keys which are engaged with the offset portions thereof and with the front face of the backing panel.

In all-metal constructions where metal frame members are utilized, a slightly modified form of male securing member or stud may be utilized. In Figs. 15 and 16 of the drawings there is disclosed a channel member 60 which constitutes the frame member of an all-metal construction. This channel member is provided at spaced points with openings 61 into which the shanks 62 of studs 63 may be driven. These studs are preferably provided with shoulders 64 which engage the web of the channel member to space the heads 65 of the studs the desired distance from the channel member. It will be noted that these heads are similar to the heads 32 of the studs 31. It will be obvious that with these studs secured to the metal frame members, any one of the several embodiments of the female members previously described may be associated with the trimmed panel and then engaged with the heads of these studs. Thus the panels with the resilient wire members secured to the same may be removably connected to the metal frame in substantially the same manner as to the wooden frame.

In Figs. 17 and 18 of the drawings there is disclosed a modification in which the male and female members of the securing means are reversed, the female members being secured to the metal frame and the male members being secured to the trimmed panel. By reference to these figures it will be noted that there is secured to the metal channel bar 60$^e$ a female element 27$^e$ which may be similar to that illustrated in Fig. 2 of the drawing. This element is spot-welded at spaced points, as designated by the reference character 70, to the web of the channel bar with the spaced portions of the wires overlying openings 71 formed in the channel bar.

Fixed to the panel 23$^e$ is a flat sheet metal strip 72, this strip preferably being provided with tongues 73 which pierce the backing panel and are bent into engagement therewith, as clearly illustrated in Fig. 18 of the drawing. Stamped from the strip 72 at spaced points are ears 74, these ears being bent at right angles to the plane of the strip and being provided with heads 75 adapted for engagement between the spaced portions of the wires 28$^e$. The heads 75 may be of any desired shape, but as shown are preferably provided with cam faces 33$^e$ and 34$^e$ similar to the faces formed on the heads of the studs 31.

With this construction it will be apparent that the sheet metal strip 72 will reinforce the edges of the backing panel to prevent warping thereof. The ears struck from these strips constitute the male members of the securing means and are adapted for snap engagement between the wires 28$^e$ of the female portion of the securing means. These wires may be spot-welded at spaced points to the metal frame member to overlie the openings in this member in the manner clearly illustrated.

From the above it will be apparent that the invention provides means for firmly but detachably securing a trimmed panel to a frame regardless of whether this frame is formed of metal or wood. The connection comprises male and female members adapted for resilient engagement with each other and so constructed that when engaged, the panel is drawn snugly into engagement with its frame. The female members are so constructed that the male members may be engaged with the same regardless of slight variations in the location of the male members so that it is not essential that the male securing members be accurately located on the frame or panel. The resilient wires constituting the female portion of the securing means are inexpensive, and the female securing members may therefore be economically manufactured on a commercial scale and may be readily secured either to the frame or panel, dependent upon the type of construction in which the connection is to be incorporated.

It will be noted that in each of the embodiments of the invention illustrated the female portion of the securing means is formed by resilient members in the form of wires which are shaped to provide elongated resilient loops. Thus loops are formed in some instances by securing two wires together at spaced points and in other instances by coiling single strips of wires to form closed loops. These loops constitute elongated resilient sockets which are adapted to receive the studs at any point throughout their length. In the specification and claims, wherever the term "loop" is used, it is to be understood that this term means not only a closed loop, but any construction in which resilient members are spaced apart to clampingly receive between the same a member such as a headed stud.

While the invention has been described with some detail, it is to be understood that the description is for the purposes of illustration only and is not definitive of the limits of the inventive idea. The right is reserved to make such changes in the details of construction and arrangement of parts as will fall within the purview of the attached claims.

What I claim as my invention is:

1. In a means for detachably securing a trimmed panel member to a frame member, a stud carried by one of said members, and means providing spaced wires carried by the other of said members for engagement with said stud, said wires being of greater length than their range of contact with the stud when the stud is in engagement therewith and being exposed for engagement with the stud throughout a greater range than the range of engaged contact with the stud.

2. In a means for detachably securing a trimmed panel member to a frame member, a stud carried by one of said members, and resilient means providing an elongated clamping member carried by the other of said members for engagement with said stud, said clamping member being of greater length than its range of contact with the stud when the stud is in engagement therewith and being exposed for engagement with the stud throughout a greater range than the range of engaged contact with the stud.

3. In a means for detachably securing a trimmed panel member to a frame member, metallic means secured to one of said members providing an elongated resilient socket, and a headed stud secured to the other of said members for engagement in said socket at any point throughout the length thereof, said resilient socket being of greater length than its range of contact with the stud when the stud is in engagement therewith and being exposed for engagement with the stud throughout a greater range than the range of engaged contact with the stud.

4. In a means for detachably securing a trimmed panel member to a frame member, a stud carried by one of said members and adapted to project into an opening formed in the other of said members, and means carried by the last mentioned member providing an elongated resilient socket adjacent said opening, said socket being of greater length than its range of contact with the stud when the stud is in engagement therewith and said opening being of greater length than the range of engaged contact of the stud with the socket.

5. In a means for detachably securing a trimmed panel member to a frame member, studs carried by one of said members, and resilient wires fixed to the other of said members, said wires being spaced from each other throughout the major portion of their length to provide elongated resilient sockets for engagement with said studs, said sockets being of greater length than their range of contact with the studs when the latter are in engagement therewith and being exposed for engagement with the studs throughout a greater range than the range of their engaged contact with the studs.

6. In a securing means for a trimmed panel, a pair of wires having offset portions spaced throughout their length, the offset portions of said wires being secured together, and means for securing said wires to the panel, the portions of said wires between said offset portions being spaced apart to provide a resilient socket.

7. In a securing means for a trimmed panel, means providing wire loops secured to said panel, said wire loops being exposed throughout their length and constituting elongated resilient sockets of greater clamping range than their range of contact with members to be clamped therein when said members are in engagement with said sockets.

8. In a securing means for a trimmed panel, a pair of resilient wires, one of said wires being provided with offset portions spaced throughout its length engageable with the other of said wires, and means for securing said wires to the panel, said wires together providing elongated resilient sockets disposed between the points of engagement of said wires with each other.

9. In a securing means for a trimmed panel, means providing resilient wire loops on one side of said panel, each of said wire loops having an offset portion projecting through an elongated opening in said panel.

10. In combination, a trimmed panel including a backing panel and an upholstery covering for said backing panel, said backing panel being provided with elongated openings spaced along one edge thereof, and means fixed to said backing panel providing elongated resilient wire loops disposed between one face of said backing panel and said upholstery covering, each of said wire loops being provided with an offset portion projecting through one of the openings in said backing panel to the other face of said backing panel.

11. In a securing means for a trimmed panel, a pair of wires welded together at spaced points, the portions of said wires between said points of weld being spaced to provide elongated resilient sockets, and means for securing said wires to a trimmed panel.

12. In a securing means for a trimmed panel, a pair of resilient wires twisted together at spaced points throughout their length, the untwisted portions of said wires being spaced from each other to provide elongated resilient sockets.

13. In a securing means for a trimmed panel, a plurality of wire loops, each of said wire loops constituting an elongated resilient socket, and means for securing said wire loops to each other and to the trimmed panel.

14. In a securing means for a trimmed panel, a pair of wires, said wires having offset portions spaced throughout their length projecting through slots in the backing panel of said trimmed panel, and means for locking the said offset portions of said wires in the said slots to secure said wires to the backing panel in spaced relation to each other.

15. In a means for securing a trimmed panel to a metal frame member, a headed stud secured to said metal frame member, and means providing elongated resilient wire loops carried by said panel member for engagement at different areas throughout their length with said studs.

16. In combination, a metal frame member having an opening therein, a headed stud having a shank portion engageable in said opening, said stud being provided with a shoulder to space the head thereof from the said frame, a panel, and an elongated resilient wire loop fixed to the panel and engageable at different areas throughout its length with the head of the said stud.

17. In a means for securing a trimmed panel to a metallic frame member, means providing resilient wire loops welded at spaced points to said metallic frame member, and means providing headed studs on said panel member for engagement with the said wire loops.

18. In a means for securing a trimmed panel to a metal frame member, resilient wire loops fixed to said metallic frame member, and a flat metal strip fixed to the panel and having ears struck therefrom for engagement with the said resilient wire loops.

19. In a means for detachably securing a panel member to a frame member, studs carried by one of said members, the other of said members having openings for receiving said studs and said openings being relatively large as compared to said studs to provide for registration of the studs with the openings despite slight variations in the relative location of said studs and openings, and means associated with the one of said members in which said openings are formed providing resilient sockets for clampingly receiving the studs regardless of the portions of the openings into which the studs extend.

20. In a means for detachably securing a panel member to a frame member, studs carried by said frame member, and means extending longitudinally of said panel member adjacent the edge thereof constituting a reinforcement and providing elongated resilient stud receiving sockets, which sockets are adapted at different areas throughout their length to clampingly receive the studs.

21. In a means for detachably securing a trimmed panel member to a frame member, studs secured to one of said members, and a pair of wires spaced throughout their length and secured to the other of said members, the spaced relation of said wires providing elongated resilient sockets of greater length than their range of contact with the studs when the latter are in engagement therewith, the sockets being exposed for engagement with the studs throughout a greater range than the range of their engaged contact with the studs.

22. In a means for detachably securing a panel member to a supporting member, a stud secured to one of said members, and a clamping member secured to the other of said members, said clamping member having an exposed range of clamping engagement with the stud greater than its range of contact with the stud when the latter is in engagement therewith.

WILLIAM C. VAN DRESSER.